United States Patent
Huang et al.

(10) Patent No.: US 8,144,169 B2
(45) Date of Patent: Mar. 27, 2012

(54) INPUT DEVICE FOR GRAPHICS

(75) Inventors: Chih-Chieh Huang, Taipei (TW); Shen-Guan Shih, Taipei County (TW)

(73) Assignee: National Taiwan University of Science and Technology, Taipei (TW)

( * ) Notice: Subject to any disclaimer, the term of this patent is extended or adjusted under 35 U.S.C. 154(b) by 651 days.

(21) Appl. No.: 12/332,355

(22) Filed: Dec. 11, 2008

(65) Prior Publication Data
US 2010/0073360 A1 Mar. 25, 2010

(30) Foreign Application Priority Data
Sep. 23, 2008 (TW) .............................. 97136536 A

(51) Int. Cl.
*G09G 5/00* (2006.01)
(52) U.S. Cl. ........ 345/619; 345/419; 345/420; 345/581; 345/582
(58) Field of Classification Search .................. None
See application file for complete search history.

(56) References Cited

U.S. PATENT DOCUMENTS

| | | | | |
|---|---|---|---|---|
| 6,483,499 | B1 * | 11/2002 | Li et al. | 345/179 |
| 6,842,175 | B1 * | 1/2005 | Schmalstieg et al. | 345/427 |
| 2001/0028345 | A1 * | 10/2001 | Natsuyama et al. | 345/179 |
| 2006/0087496 | A1 * | 4/2006 | Maciejewski | 345/173 |

FOREIGN PATENT DOCUMENTS
TW I222008 10/2004
TW I264674 10/2006
* cited by examiner

*Primary Examiner* — Kee M Tung
*Assistant Examiner* — Jwalant Amin
(74) *Attorney, Agent, or Firm* — Jianq Chyun IP Office

(57) ABSTRACT

An input device for editing a 3D model displayed in a screen is provided. The input device includes a signal transceiver module and a telescopic sensing component. The signal transceiver module communicates with a graphic system to obtain information of the 3D model. The signal transceiver module includes a first and a second transceiver respectively disposed at a first and a second location of the input device for obtaining a plurality of spatial information of the input device. An expansion of the telescopic sensing component reflects the force of the input device applied to the screen, and the length of the input device is adjusted according to the force. The signal transceiver module transmits the expansion and the spatial information to the graphic system to allow the graphic system to generate a virtual object in the 3D model for simulating the state of the input device merging into the screen.

7 Claims, 2 Drawing Sheets

INPUT DEVICE FOR GRAPHICS

CROSS-REFERENCE TO RELATED APPLICATION

This application claims the priority benefit of Taiwan application serial no. 97136536, filed on Sep. 23, 2008. The entirety of the above-mentioned patent application is hereby incorporated by reference herein and made a part of specification.

BACKGROUND OF THE INVENTION

1. Field of the Invention

The present invention generally relates to an input device, and more particularly, to an input device suitable for editing a 3D model.

2. Description of Related Art

Nowadays, colorful 3D models can be precisely rendered by computers thanks to the development of multimedia techniques. A user can draw or edit a 3D model by operating a computer aided design (CAD) software (for example, 3D-Max, Sketch-up, and AutoCAD, etc) through input devices (for example, a mouse, a keyboard, and a handwriting graphic tablet) of a computer.

However, none of the existing input devices can provide an intuitional operation interface to the user. In other words, the user has to look at the 3D model displayed in a screen and at the same time operates the mouse or keyboard to edit the 3D model. Such an operation pattern is very complicated and tedious to the user. Accordingly, an input device which allows the user to draw or edit the 3D model in a more intuitional way and accordingly simplifies the operation of the user for editing the 3D model is desired. If the user can feel real experience by the input device when editing the 3D model, like an artist naturally draws or sculptures an object, the complication of operation may be simplified.

SUMMARY OF THE INVENTION

Accordingly, the present invention is directed to an input device which can simulate a visual feedback and a physical feedback when a 3D model is edited, wherein the visual feedback is to display a simulated state of the input device merging into a screen, and the physical feedback is to allow the input device to reflect a reaction force of an object in the 3D model when the object is edited according to the physical characteristics of the object. Thereby, a user can edit the 3D model through the coordination of his hands and eyes in a more intuitional way.

The present invention provides an input device suitable for editing a 3D model displayed in a screen. The input device includes a signal transceiver module and a telescopic sensing component. The signal transceiver module communicates with a graphic system to allow the input device to obtain information of the 3D model. The signal transceiver module includes a first transceiver and a second transceiver which are respectively disposed at a first location and a second location of the input device for obtaining a plurality of spatial information of the input device. The telescopic sensing component is coupled to the signal transceiver module. An expansion of the telescopic sensing component reflects a force of the input device applied to the screen, and the length of the input device is adjusted according to the force. The signal transceiver module transmits the expansion and the spatial information to the graphic system to allow the graphic system to generate a virtual object in the 3D model for simulating the state of the input device merging into the screen.

According to an embodiment of the present invention, the input device further includes a force feedback sensing component coupled to the signal transceiver module. When the virtual object touches a target object in the 3D model, the force feedback sensing component simulates a reaction force of the target object applied to the input device when the target object is edited according to the physical characteristics of the target object.

According to an embodiment of the present invention, the input device further includes a pressure sensing component coupled to the signal transceiver module. When the pressure sensing component receives an input instruction, the input device adds a material into the 3D model.

The input device provided by the present invention obtains the information of the 3D model and the spatial information of the input device through signal transmission between the signal transceiver module and the graphic system. The telescopic sensing component adjusts the length of the input device according to the force of the input device applied to the screen and accordingly obtains the length of the input device merged into the screen. Thus, the signal transceiver module transmits the spatial information of the input device and the expansion of the telescopic sensing component to the graphic system to allow the graphic system to generate the virtual object in the 3D model for simulating the state of the input device merging into the screen.

In addition, the force feedback sensing component obtains the physical characteristics of the target object in the 3D model from the signal transceiver module. When the virtual object for simulating the state of the input device merging into the screen touches the target object, the force feedback sensing component simulates the reaction force of the target object applied to the input device. Accordingly, the input device allows a user to edit the 3D model in an intuitional way.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
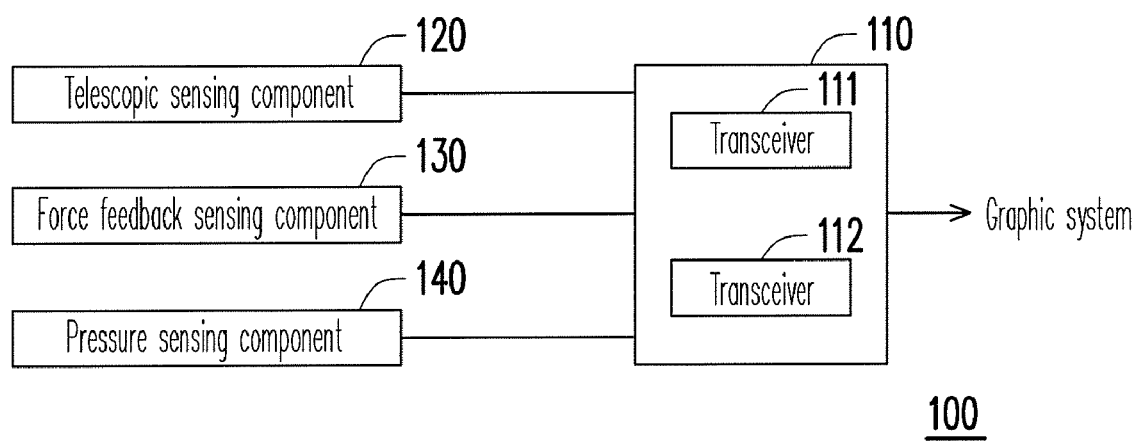
FIG. 1 is a diagram of an input device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram of an input device according to an embodiment of the present invention. Referring to FIG. 1, the input device 100 is suitable for editing a 3D model displayed in a screen, wherein the screen may be a liquid crystal display (LCD) panel or a projection screen of a projector. The input device 100 includes a signal transceiver module 110, a telescopic sensing component 120, a force feedback sensing component 130, and a pressure sensing component 140. The signal transceiver module 110 allows the input device 100 to communicate with a graphic system to obtain information of the 3D model. The signal transceiver module 110 includes a transceiver 111 and a transceiver 112 which are respectively disposed at two different locations in the input device 100. Accordingly, spatial information (for example, location, direction, and length, etc) of the input device 100 can be obtained through signal transmission between the signal transceiver module 110 and the graphic system. The transceivers 111 and 112 may be infrared transceivers, Bluetooth transceivers, universal asynchronous receivers/transmitters (UARTs), or universal synchronous/asynchronous receivers/transmitters (USARTs).

The telescopic sensing component 120 is coupled to the signal transceiver module 110. The telescopic sensing component 120 is an elastic device, such as a spring. An expansion of the telescopic sensing component 120 reflects a force of the input device 100 applied to the screen, and the telescopic sensing component 120 adjusts the length of the input device 100 according to this force, wherein the telescopic sensing component 120 can convert its expansion into an electronic signal to be read by the signal transceiver module 110. The signal transceiver module 110 transmits the spatial information of the input device 100 and the expansion of the telescopic sensing component 120 to the graphic system. When the input device 100 touches the screen and accordingly the length thereof is reduced, the graphic system with calculation ability processes the information to obtain the length, shape, direction, and angle of the portion of the input device 100 which merges into the screen and generates a virtual object in the 3D model for simulating the state of the input device merging into the screen.

The force feedback sensing component 130 is coupled to the signal transceiver module 110. When the virtual object touches a target object in the 3D model, the force feedback sensing component 130 obtains the physical characteristics of the target object through the signal transceiver module 110 and simulates the reaction force of the target object applied to the input device 200 when the input device 100 edits the target object. Herein, if the input device 100 receives an input instruction (for example, if the input device 100 cuts the target object), a material on the target object is deleted. The pressure sensing component 140 is coupled to the signal transceiver module 110 for sensing a pressure applied by a user (i.e., anther input instruction) and adds a material into the 3D model according to the pressure.

Figure 2A:
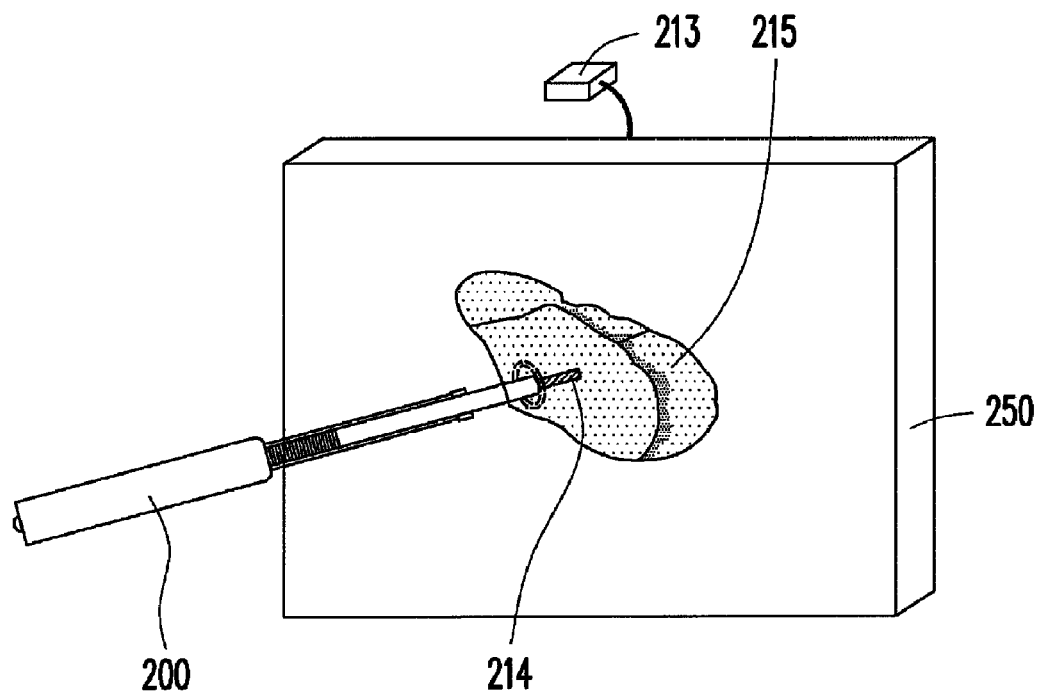
FIG. 2A is a structural diagram of an input device according to an embodiment of the present invention.
Figure 2B:
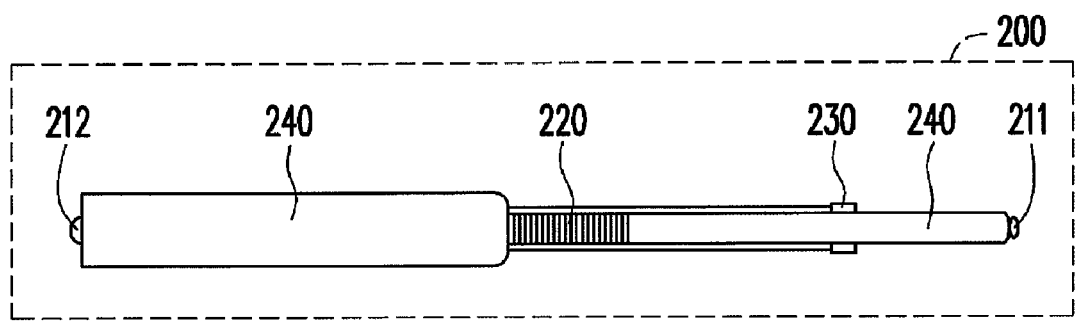
FIG. 2B is a diagram illustrating how the input device in FIG. 2A edits a 3D model according to an embodiment of the present invention.

An embodiment of the present invention will be described below in order to allow those having ordinary knowledge in the art to implement the present invention according to the present disclosure. FIG. 2A is a structural diagram of an input device according to an embodiment of the present invention. FIG. 2B is a diagram illustrating how the input device in FIG. 2A edits a 3D model according to the present embodiment. Referring to FIG. 2A, the input device 200 is implemented as a pen structure, which is referred to as a sculpting pen. The sculpting pen 200 includes a telescopic sensing component 220, a pressure sensing component 240, a force feedback sensing component 230, and a signal transceiver module composed of transceivers 211 and 212. The transceivers 211 and 212 are respectively disposed at a pen head and a pen tail of the sculpting pen 200 to allow the sculpting pen 200 to communicate with a graphic system, wherein a transceiver 231 is disposed correspondingly on the screen 250, as shown in FIG. 2B. Accordingly, the location, length, and direction of the sculpting pen 200 can be obtained through signal transmission between the sculpting pen 200 and the graphic system.

The telescopic sensing component 220 may be a spring. Referring to FIG. 2B, when the sculpting pen 200 touches the screen 250 and applies a force thereon, the length of the sculpting pen 200 is increased or decreased through the pen body 240 which moves according to different expansion of the telescopic sensing component 220. Herein, the telescopic sensing component 220 converts the expansion thereof into an electronic signal and transmits information about the expansion thereof to the graphic system through the transceiver 211 and/or the transceiver 212. The graphic system then generates the portion of the sculpting pen 200 (i.e., a virtual object 214) which merges into the screen. In addition, when the virtual object 214 touches a target object 215 (for example, a stone object) in the 3D model, the force feedback sensing component 230 reflects a reaction force of the target object 215 applied to the sculpting pen 200 according to the physical characteristics (for example, the hardness) of the target object 215.

Herein, the force feedback sensing component 230 may be implemented through different methods. For example, the pen body 240 may have a plurality of joints, and when the sculpting pen 200 touches the target object 215, the force feedback sensing component 230 may lock a specific joint on the pen body 240 to reflect that the sculpting pen 200 touches an object. In addition, the materials of the force feedback sensing component 230 and the pen body 240 may be mixed with a magnetic material so that when the reaction force applied by the target object 215 grows stronger, the force feedback sensing component 230 changes the intensity of an electric field according to a current thereof and accordingly changes the force of the force feedback sensing component 230 for suctioning the pen body 240. Accordingly, the effect that the sculpting pen 200 touches a target object 215 of different hardness can be rendered.

While editing the 3D model, if the sculpting pen 200 receives an input instruction and accordingly is about to cut the target object 215, the sculpting pen 200 deletes a material on the target object 215 to sculpt the target object 215. The pressure sensing component 240 may be a soft rubber material covering the sculpting pen 200. When the pressure sensing component 240 receives an input instruction and accordingly is pressed, the sculpting pen 200 adds a material into the 3D model.

As described above, the information of the 3D model and the spatial information of the input device are obtained through the communication between the input device and the graphic system, and the length of the input device is adjusted through the telescopic sensing component, wherein an expansion of the telescopic sensing component reflects the force of the input device applied to the screen. The graphic system generates a virtual object for simulating the state of the input device merging into the screen according to the spatial information of the input device and the expansion of the telescopic sensing component, so as to present a visual feedback to a user. Moreover, the force feedback sensing component reflects a reaction force of a target object in the 3D model according to the physical characteristics of the target object, so as to present a physical feedback of the target object to the user. Thereby, the user can edit the 3D model through the coordination of his hands and eyes in an intuitional way.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An input device for graphics, suitable for editing a 3D model displayed in a screen, the input device comprising:
   a signal transceiver module, for communicating with a graphic system to obtain an information of the 3D model, wherein the signal transceiver module comprises a first transceiver and a second transceiver respectively disposed at a first location and a second location of the input device for obtaining a plurality of spatial information of the input device;
   a telescopic sensing component, coupled to the signal transceiver module, wherein an expansion of the telescopic sensing component reflects a force of the input device applied to the screen, and a length of the input device is adjusted according to the force;
   wherein the signal transceiver module transmits the expansion and the spatial information to the graphic system to allow the graphic system to generate a virtual object in the 3D model for simulating a state of the input device merging into the screen; and
   a pressure sensing component, coupled to the signal transceiver module, wherein the pressure sensing component adds a material into the 3D model when the pressure sensing component receives an input instruction.

2. The input device according to claim 1 further comprising:
   a force feedback sensing component, coupled to the signal transceiver module, wherein when the virtual object touches a target object in the 3D model, the force feedback sensing component simulates a reaction force of the target object applied to the input device when the target object is edited according to a physical characteristic of the target object.

3. The input device according to claim 2, wherein the input device deletes a material on the target object when the input device receives an input instruction and the virtual object touches the target object.

4. The input device according to claim 1, wherein the telescopic sensing component is a spring.

5. The input device according to claim 1, wherein the spatial information comprises a position, a direction, and a length of the input device.

6. The input device according to claim 1, wherein the input device has a pen structure.

7. The input device according to claim 6, wherein the first location and the second location are respectively a pen head and a pen tail of the input device.

* * * * *